United States Patent
Sipra et al.

(10) Patent No.: US 11,070,477 B2
(45) Date of Patent: *Jul. 20, 2021

(54) DISTRIBUTED SOFTWARE DEFINED WIRELESS PACKET CORE SYSTEM

(71) Applicant: Google LLC, Mountain View, CA (US)

(72) Inventors: Hassan Sipra, San Jose, CA (US); Ankur Jain, Mountain View, CA (US); Bok Knun Randolph Chung, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,278

(22) Filed: Sep. 25, 2019

(65) Prior Publication Data

US 2020/0092207 A1    Mar. 19, 2020

Related U.S. Application Data

(63) Continuation of application No. 15/270,831, filed on Sep. 20, 2016, now Pat. No. 10,469,391.

(Continued)

(51) Int. Cl.
*H04W 28/08* (2009.01)
*H04L 12/803* (2013.01)
(Continued)

(52) U.S. Cl.
CPC .......... *H04L 47/125* (2013.01); *H04L 41/042* (2013.01); *H04L 41/044* (2013.01);
(Continued)

(58) Field of Classification Search
CPC .................................. H04W 72/026
See application file for complete search history.

(56) References Cited

U.S. PATENT DOCUMENTS

| 8,111,630 B2 | 2/2012 | Kovvali et al. |
| 8,521,905 B2 | 8/2013 | Beliveau et al. |

(Continued)

FOREIGN PATENT DOCUMENTS

| CN | 102938910 A | 2/2013 |
| CN | 103532878 A | 1/2014 |

(Continued)

OTHER PUBLICATIONS

First Examination Report for Indian Patent Application No. 201747045877 dated May 15, 2020. 6 pages.

(Continued)

*Primary Examiner* — Sulaiman Nooristany
(74) *Attorney, Agent, or Firm* — Lerner, David, Littenberg, Krumholz & Mentlik, LLP

(57) ABSTRACT

A distributed software defined network (SDN) packet core system is configured to support a plurality of radio access technologies. The distributed SDN packet core system can include a cloud-based SDN centralized infrastructure instance and a plurality of local SDN infrastructure instances distributed in proximity to wireless access networks and radio access points thereof. The cloud-based centralized SDN infrastructure instance can be configured to handle network operations that are not latency sensitive. Each local SDN infrastructure instance can include a plurality of computer devices configured to execute a plurality of RAT specific control-plane modules and a plurality of RAT independent packet processing modules for performing latency sensitive network operations.

18 Claims, 5 Drawing Sheets

US 11,070,477 B2
Page 2

Related U.S. Application Data

(60) Provisional application No. 62/242,677, filed on Oct. 16, 2015, provisional application No. 62/242,668, filed on Oct. 16, 2015, provisional application No. 62/222,406, filed on Sep. 23, 2015.

(51) Int. Cl.

| | | |
|---|---|---|
| *H04L 29/06* | (2006.01) | |
| *H04L 12/24* | (2006.01) | |
| *H04L 29/08* | (2006.01) | |
| *H04L 12/717* | (2013.01) | |
| *H04W 36/00* | (2009.01) | |
| *H04L 12/26* | (2006.01) | |
| *H04L 12/715* | (2013.01) | |
| *H04W 28/10* | (2009.01) | |
| *H04L 12/721* | (2013.01) | |
| *H04W 24/04* | (2009.01) | |
| *H04W 72/04* | (2009.01) | |
| *H04L 29/12* | (2006.01) | |
| *H04W 36/08* | (2009.01) | |
| *H04W 40/36* | (2009.01) | |
| *H04W 88/10* | (2009.01) | |
| *H04W 36/14* | (2009.01) | |
| *H04W 36/36* | (2009.01) | |

(52) U.S. Cl.
CPC ...... *H04L 41/0893* (2013.01); *H04L 43/0817* (2013.01); *H04L 45/42* (2013.01); *H04L 45/44* (2013.01); *H04L 45/64* (2013.01); *H04L 61/2007* (2013.01); *H04L 61/6022* (2013.01); *H04L 67/1004* (2013.01); *H04L 67/1029* (2013.01); *H04L 67/288* (2013.01); *H04L 69/22* (2013.01); *H04W 24/04* (2013.01); *H04W 28/08* (2013.01); *H04W 28/10* (2013.01); *H04W 36/00* (2013.01); *H04W 36/0011* (2013.01); *H04W 36/08* (2013.01); *H04W 40/36* (2013.01); *H04W 72/0426* (2013.01); *H04L 43/0852* (2013.01); *H04W 36/14* (2013.01); *H04W 36/36* (2013.01); *H04W 88/10* (2013.01)

(56) References Cited

U.S. PATENT DOCUMENTS

| | | | |
|---|---|---|---|
| 9,264,944 B1 | 2/2016 | Brewer | |
| 10,069,648 B2 | 9/2018 | Suzuki | |
| 2007/0053334 A1 | 3/2007 | Sueyoshi et al. | |
| 2007/0115906 A1 | 5/2007 | Gao et al. | |
| 2009/0094611 A1 | 4/2009 | Danne et al. | |
| 2009/0228589 A1 | 9/2009 | Korupolu | |
| 2011/0044218 A1* | 2/2011 | Kaur | H04W 76/16 370/310 |
| 2012/0106333 A1 | 5/2012 | Lee et al. | |
| 2012/0204224 A1 | 8/2012 | Wang et al. | |
| 2012/0300615 A1 | 11/2012 | Kempf et al. | |
| 2013/0021933 A1 | 1/2013 | Kovvali et al. | |
| 2013/0054761 A1* | 2/2013 | Kempf | H04L 47/781 709/220 |
| 2013/0094472 A1 | 4/2013 | Klingenbrunn et al. | |
| 2013/0139243 A1 | 5/2013 | Poola et al. | |
| 2013/0242727 A1 | 9/2013 | Shaikh | |
| 2013/0272127 A1 | 10/2013 | Ali et al. | |
| 2013/0297798 A1 | 11/2013 | Arisoylu et al. | |
| 2013/0329601 A1 | 12/2013 | Yin et al. | |
| 2014/0038654 A1 | 2/2014 | Ahmadi | |
| 2014/0101726 A1 | 4/2014 | Gupta et al. | |
| 2014/0259012 A1 | 9/2014 | Nandlall et al. | |
| 2014/0269284 A1 | 9/2014 | Amanna, III et al. | |
| 2014/0341199 A1 | 11/2014 | Jeon et al. | |
| 2014/0348130 A1 | 11/2014 | Kaippallimalil et al. | |
| 2015/0055623 A1* | 2/2015 | Li | H04W 40/04 370/331 |
| 2015/0063346 A1 | 3/2015 | Eswara et al. | |
| 2015/0103665 A1 | 4/2015 | Kaippallimalil et al. | |
| 2015/0124622 A1 | 5/2015 | Kovvali et al. | |
| 2015/0124815 A1 | 5/2015 | Beliveau et al. | |
| 2015/0200859 A1 | 7/2015 | Li et al. | |
| 2015/0382240 A1 | 12/2015 | Hecht et al. | |
| 2016/0085641 A1 | 3/2016 | Nagasubramaniam et al. | |
| 2016/0100340 A1 | 4/2016 | Kim et al. | |
| 2016/0127889 A1 | 5/2016 | Cui et al. | |
| 2016/0150448 A1 | 5/2016 | Perras et al. | |
| 2016/0156513 A1 | 6/2016 | Zhang et al. | |
| 2016/0182378 A1 | 6/2016 | Basavaraja et al. | |
| 2016/0301595 A1 | 10/2016 | Ashida | |
| 2016/0315785 A1 | 10/2016 | Dronadula et al. | |
| 2016/0381146 A1 | 12/2016 | Zhang et al. | |
| 2018/0248713 A1 | 8/2018 | Zanier et al. | |

FOREIGN PATENT DOCUMENTS

| | | | |
|---|---|---|---|
| CN | 103931149 | A | 7/2014 |
| CN | 104023335 | A | 9/2014 |
| CN | 104301146 | A | 1/2015 |
| CN | 104662959 | A | 5/2015 |
| JP | 2010081605 | A | 4/2010 |
| JP | 2014531792 | A | 11/2014 |
| JP | 2015008407 | A | 1/2015 |
| JP | 2015146470 | A | 8/2015 |
| JP | 2016524827 | A | 8/2016 |
| WO | 2010057198 | A1 | 5/2010 |
| WO | 2011037197 | A1 | 3/2011 |
| WO | 2013030693 | A1 | 3/2013 |
| WO | 2014209007 | A1 | 12/2014 |
| WO | 2015009939 | A1 | 1/2015 |
| WO | 2015105987 | A1 | 7/2015 |

OTHER PUBLICATIONS

Notice of Allowance for Japanese Patent Application No. 2017-566111 dated Jul. 23, 2019. 3 pages.
Aricent, Demystifying Routing Services in Software-Defined Networking, (c) 2013 Aricent Group. Retrieved from http:/www3.aricent.com/demystifying-routing-services-in-sdn-whitepaper/ on Sep. 20, 2016 (12 pages).
International Search Report and Written Opinion dated Jan. 24, 2017 in PCT Application No. PCT/US2016/052676 (100699-0633).
International Preliminary Report on Patentability under Chapter II dated Dec. 5, 2017 in International (PCT) Application No. PCT/US2016/052674.
Extended European Search Report dated Oct. 24, 2018 in European Patent Application No. 16849427.6.
Office Action dated Nov. 7, 2018 in Korean Patent Application No. 10-2018-7005319.
International Search Report and Written Opinion dated Dec. 1, 2016 in PCT Application No. PCT/US2016/052674 (100699-0609).
Invitation to Pay Additional Fees and, Where Applicable, Protest Fee mailed Dec. 1, 2016 in PCT Application No. PCT/US2016/052676 (100699-0633).
International Search Report and Written Opinion dated Jan. 2, 2017 in PCT Application No. PCT/US2016/0052679 (100699-0634).
Li, Yuhong, et al.: Software Defined Networking for Distributed Mobility Management, in 2013 IEEE Globecom Workshops, Dec. 2013, pp. 885-889, IEEE.
Morelli, Arianna: Final Architecture Design, Mar. 3, 2015, pp. 1-79, retrieved from URL: http://www.ict-crowd.eu/downloads/deliverable/CROWD_D1.3_V1.1.pdf.
Seite, Pierrick: Initial Specification of Connectivity Management Concepts and Architecture, Sep. 30, 2013, pp. 1-103, retrieved from URL: http://www.ict-crowd.eu/downloads/deliverable/CROWD_D4.1.pdf.
Office Action dated Mar. 20, 2018 in United Kingdom Patent Application No. 1801422.5.
Office Action dated Jun. 28, 2018 in Australian Patent Application No. 2016325529.

(56) References Cited

OTHER PUBLICATIONS

Office Action dated Sep. 18, 2018 in Japanese Patent Application No. 2017-566111.
Office Action dated Sep. 25, 2018 in Japanese Patent Application No. 2018-504191.
Office Action dated Oct. 19, 2018 in U.S. Appl. No. 15/270,846.
Office Action dated Oct. 22, 2018 in U.S. Appl. No. 15/270,862.
Office Action dated Oct. 23, 2018 in Japanese Patent Application No. 2018-504266.
Office Action dated Feb. 12, 2019 in U.S. Appl. No. 15/270,862.
Examination Report dated Apr. 24, 2019 in United Kingdom Patent Application No. 1801422.5.
Notice of Allowance dated May 22, 2019 in U.S. Appl. No. 15/270,862.
Notice of Allowance dated May 7, 2019 in Korean Patent Application No. 10-2018-7005319, and English translation thereof.
Office Action dated Apr. 26, 2019 in Singapore Patent Application No. 11201801018V.
Office Action dated Dec. 6, 2018 in Korean Patent Application No. 10-2018-7005477, and English translation thereof.
Aruba Networks, Aruba HybridContro™ Architecture for Service Providers (c) 2013 Aruba Networks, Inc. Retrieved from http://www.arubanetworks.com/pdf/solutions/TB_Aruba_HybridControl.pdf on Sep. 20, 2016 (12 pages).
Avaya, When SDN meets Mobility, (c) 2015 Avaya Inc. Retrieved from https://www.avaya.com/en/documents/when-sdn-meets-mobility-dn7711.pdf on Sep. 20, 2016 (6 pages).
Giust, Fabio, et al. HDMM: Deploying client and network-based Distributed Mobility Management, Telecommunication Systems, vol. 59, No. 2, pp. 247-270, Jun. 2015.
Heinonen, Johanna, et al.: Dynamic Tunnel Switching for SDN-Based Cellular Core Network& Retrieved from https://pdfs.semanticscholar.org/4120/2d4907550dfbec2096bb07997f6dba838f66.pdf on Sep. 20, 2016 (12 pages).
Heinonen, Johanna, et al.: Dynamic Tunnel Switching for SDN-Based Cellular Core Networks, Proceedings of the 4th workshop on All things cellular: operations, applications, & challenges, ACM, pp. 27-32, Aug. 2014.
Hummel, Karin Anna: ATCN 2014: SDN-Mobility and SDN: Mobility Management and Mobile Networks, Retrieved from http://docplayer.net/10260348-Atcn-2014-sdn-mobility-and-sdn-mobility-management-and-mobile-networks.html on Sep. 20, 2016 (18 pages).

Jain, Sushant, et al.: B4: Experience with a globally-deployed software defined WAN, ACM SIGCOMM Computer Communication Review vol. 43, No. 4, pp. 3-14, Sep. 2013.
Lippis III, Nicholas John: A Software-Defined Networking Approach to Branch Office Routing, A Lippis Consulting Industry Paper, Feb. 2013. Retrieved from http://www.cisco.com/c/dam/en/us/products/collateral/unified-commmunications/hosted-collaboration-solution-hcs/cloud_connector_sdn.pdf on Sep. 20, 2016 (8 pages).
Liu, D.L., et al.: Cloud Based Mobile Core Network Problem Statement, Network Working Group. Retrieved from https://tools.ieff.org/id/draft-liu-dmm-deployment-scenario-01.html on Sep. 20, 2016 (6 pages).
MEVICO Celtic Telecommunications Solutions, Advanced EPC Architecture for Smart Traffic Steering, Document identified D2.2, Jan. 31, 2013. Retrieved from http://citeseerx.ist.psu.edu/viewdoc/download?doi=10.1.1.464.9537&rep=rep1&type=pdf on Sep. 20, 2016 (93 pages).
Vanbever, Laurent: On integrating Software-Defined Networking within existing routing systems, Stanford University Networking Seminar, Nov. 13, 2013. Retrieved from http://netseminar.stanford.edu/seminars/11_13_13.pdf on Sep. 20, 2016 (97 pages).
Office Action for European Patent Application No. 16849427.6 dated Feb. 19, 2020. 5 pages.
Nguyen, Van-Giang et al. SDN and Virtualization-Based LTE Mobile Network Architectures: A Comprehensive Survey. Wireless Personal Communications, Springer, Dordrecht, NL, vol. 86, No. 3, Aug. 6, 2015 (Aug. 6, 2015), pp. 1401-1438, XP035935761, ISSN: 0929-6212, DOI: 10.1007511277-015-2997-7.
Extended European Search Report for European Patent Application No. 20178447.7 dated Jul. 7, 2020. 10 pages.
Notification of the First Office Action for Chinese Patent Application No. 201680050430.1 dated May 6, 2020. 8 pages.
Notification of the First Office Action for Chinese Patent Application No. 201680050429.9 dated Jul. 30, 2020. 7 pages.
Notice of Grant for Chinese Patent Application No. 201680050429.9 dated Jan. 27, 2021. 4 pages.
First Examination Report for Indian Patent Application No. 201847003245 dated Aug. 24, 2020. 8 pages.
First Examination Report for Indian Patent Application No. 201847003246 dated Dec. 18, 2020. 7 pages.
Examination Report under section 18(3) for UK Patent Application No. GB1801423.3 dated Feb. 2, 2021. 2 pages.
Notification of the First Office Action for Chinese Patent Application No. 201680038676.7 dated Apr. 6, 2021 9 pages.

\* cited by examiner

DISTRIBUTED SOFTWARE DEFINED WIRELESS PACKET CORE SYSTEM

CROSS-REFERENCE TO RELATED APPLICATIONS

The present application is a continuation of U.S. patent application Ser. No. 15/270,831, filed on Sep. 20, 2016, which claims priority to U.S. Provisional Application No. 62/222,406, filed Sep. 23, 2015, entitled "DISTRIBUTED SOFTWARE DEFINED WIRELESS PACKET CORE SYSTEM"; U.S. Provisional Application No.: 62/242,668, filed Oct. 16, 2015, entitled "SYSTEMS AND METHODS FOR MOBILITY MANAGEMENT IN A DISTRIBUTED SOFTWARE DEFINED NETWORK PACKET CORE SYSTEM"; and U.S. Provisional Application No.: 62/242,677, filed Oct. 16, 2015, entitled "SYSTEMS AND METHODS FOR LOAD BALANCING IN A DISTRIBUTED SOFTWARE DEFINED NETWORK PACKET CORE SYSTEM," the contents of all of which are hereby incorporated herein by reference.

FIELD OF THE DISCLOSURE

The present disclosure relates generally to the field of communication networks.

BACKGROUND

More users are switching to (or more often using) mobile networks to access the Internet or to communicate with other users. Many mobile devices are equipped with communication capabilities associated with a variety of radio access technologies. As such, users have the flexibility to switch between distinct radio access networks based, for instance, on availability, cost or performance of such radio access networks.

SUMMARY

According to at least one aspect of this disclosure, a distributed software defined network (SDN) packet core system includes at least one cloud-based centralized SDN infrastructure instance and a plurality of interconnected local SDN infrastructure instances. The at least one cloud-based centralized SDN infrastructure instance can include a subscriber module for authenticating client devices communicating with the SDN packet core system. Each local SDN infrastructure instance can include a plurality of computer devices arranged geographically in proximity, and communicatively coupled, to a respective plurality of radio access points associated with at least two radio access technologies (RATs). The computer devices for each local SDN infrastructure instance can be configured to execute software modules for processing control messages and data packets of communication flows associated with the respective radio access points. The software modules can include a plurality of RAT-specific control-plane modules, associated with at least two radio access technologies (RATs), and a plurality of RAT independent data-plane modules. Each RAT-specific control-plane module can be configured to execute control signals and operations for communication flows associated with a respective RAT. The RAT independent data-plane modules can be configured to process data packets associated with communication flows served by the local SDN infrastructure instance.

DETAILED DESCRIPTION

Figure 1:
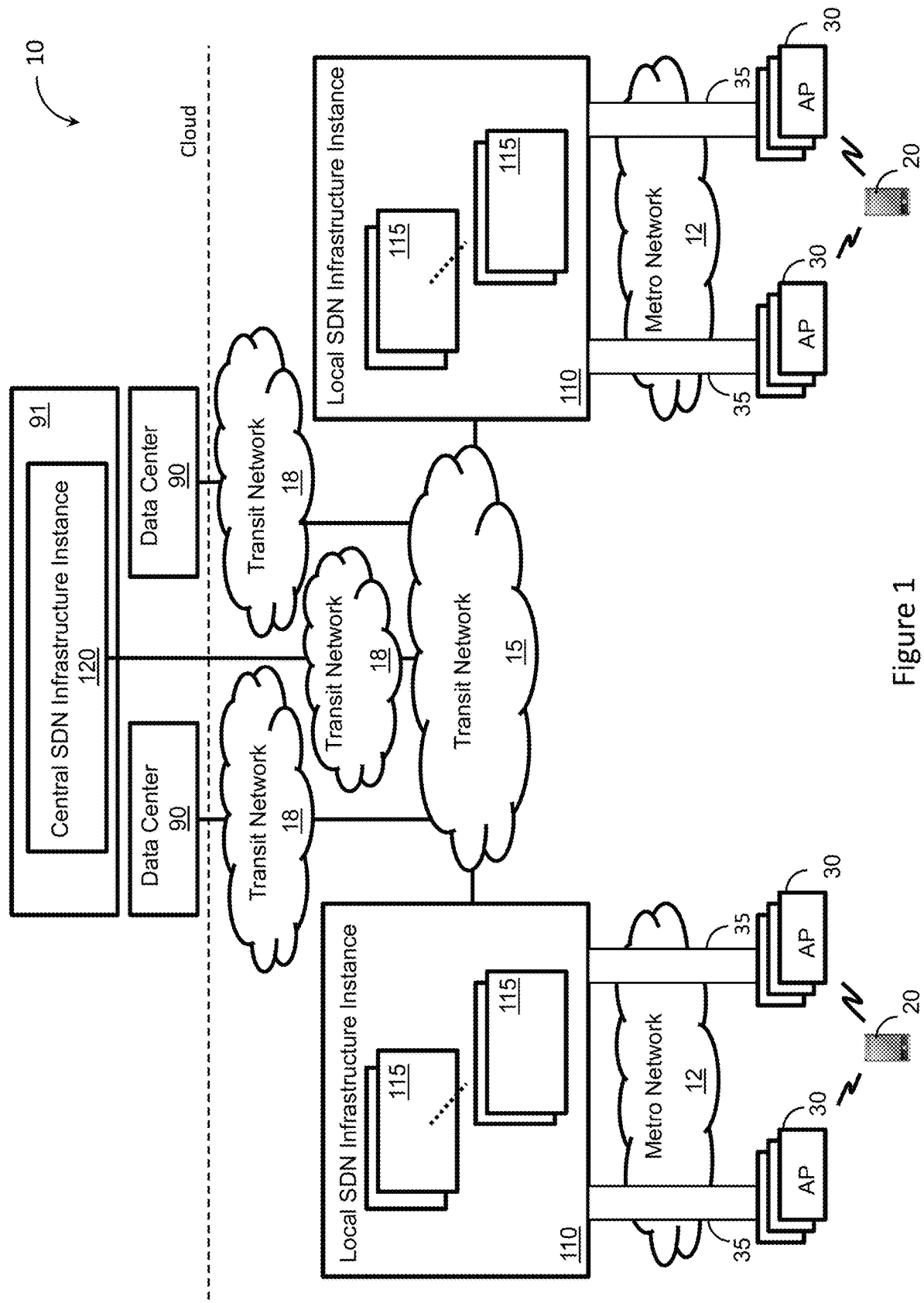
FIG. 1 shows a block diagram illustrating an overview of a communication environment employing a distributed software defined network (SDN) packet core system.

Increasing numbers of mobile users and increasing volumes of mobile data traffic call for continuous and costly investments in network infrastructure by mobile network operators. Mobile users are more frequently accessing content provider data through a variety of wireless access networks. Mobile devices can be equipped with capabilities for accessing different radio access networks associated with different radio access technologies (RATs) such as $3^{rd}$ generation (3G) mobile telecommunications technology, long-term evolution (LTE) mobile telecommunications technology, WiFi, proprietary high-altitude platforms or other radio access technologies.

When accessing the Internet, a mobile user can use different modes of connectivity depending on a respective user context. For instance, the mobile user can access the Internet through WiFi at home, through cellular access networks outdoors or through guest WiFi services in retail spaces, airports or other public places. Users usually have different ways to authenticate themselves with distinct access networks, different billing arrangements and different security guarantees or policies. Also, roaming between distinct access networks results in connectivity interruption. These factors lead to a fragmented user experience. Mobile users would appreciate a unified service providing heterogeneous radio access with seamless mobility between RATs.

One of the ways to improve user experience is to provide a system architecture that enables cohesion of heterogeneous radio access networks into a single service domain. In designing such system architecture, different factors are to be considered, including system scalability (e.g., with respect to new RATs or increases in network capacity), system complexity, infrastructure cost and inter-RAT mobility. Also, enabling inter-working between different radio access networks presents significant technical challenges. For instance, the 3GPP defined Evolved Packet System (EPS) is strictly tailored for cellular network operators and strictly uses respective subscriber management systems (e.g. SIM cards), which are very tightly coupled to the Evolved Packet Core (EPC) infrastructure. Providing inter-working between 3GPP networks (such as 3G, LTE or LTE-A) and non-3GPP networks (such as WiFi) may require integration of non-3GPP subscriber management tools into 3GPP subscriber management systems (such as SIM card identification of a WiFi device) or visa versa. Performing such an integration process involves substantial modifications to the packet core system each time a new RAT is added and, therefore, hinders the system scalability with respect to adding new RATs. Furthermore, 3GPP EPC implementations with a rigid structure based on respective legacy protocols make any inter-working solutions (such as between 3GPP and non-3GPP radio access networks) challenging, complex and non-scalable.

In this disclosure, a distributed software defined network (SDN) packet core system is configured to operate as a large scale single service domain providing cohesion of heterogeneous radio access networks. The distributed SDN packet core system can provide seamless connectivity to end users independent of the access network to which they connect and enables transparent roaming between separate access networks. The distributed SDN packet core system is also referred to as a distributed virtual evolved packet core (vEPC).

FIG. 1 shows a block diagram illustrating an overview of a communication environment 10 employing a distributed software defined network (SDN) packet core system. The communication environment 10 includes a plurality of radio access points (APs) 30 serving mobile devices 20 in their proximity, a plurality of local SDN infrastructure instances 110, a central SDN infrastructure instance 120, one or more metropolitan area networks 12, a first transit network 15, one or more second transit networks 18 and one or more data centers 90. Each local SDN infrastructure instance 110 includes a plurality of computer devices 115.

The mobile devices 20 can include without limitation a mobile phone, smart phone, tablet, laptop, smart watch, wearable item with communications capabilities, audio playing device (such as an MP3 player), video playing device, gaming device, global positioning system (GPS) device, automotive computer or any other client device with communication capabilities. The mobile device 20 can attach to a mobile access network via wireless links at respective access points 30. In some implementations, the mobile device 20 can be configured to request and access content associated with a content provider network via the distributed SDN packet core system. For instance, an application (such as a browser, media player, game application/platform, email application, enterprise application, social media applications, or the like) running on the mobile device 20 can request content available from a data center 90 for display on a screen of the mobile device 20.

The radio access points (APs) 30 can be configured to communicate with mobile devices 20 via wireless links. The APs 30 can be part of separate radio access networks (such as a WiFi hotspot network, universal mobile telecommunications system (UMTS) network, long-term evolution (LTE) network or any other mobile communication network associated with at least two distinct radio access technologies (RATs) such as 3G, LTE/LTE-A, WiFi or other RATs. For instance the APs 30 can include a Node B, evolved Node B (eNode B), WiFi hotspot or radio access points of other types. The APs 30 can be distributed over a large geographical area defining one or more states, a country or multiple countries and each AP 30 can be configured to serve mobile devices 20 in a respective geographical neighborhood. Each AP 30 can be configured to communicate directly with mobile devices 20 in its neighborhood through an air interface and can be coupled to a respective local SDN infrastructure instance 110 through a metro ISP network 12. As a mobile device 20 moves from one geographical location to another, the respective wireless connection can be transferred (or handed over) from one AP 30 to another based on the proximity of the mobile device 20 to distinct APs 30.

The plurality of local SDN infrastructure instances 110 represent a set of distributed computing or network processing resource pools deployed in close proximity to and serving radio access networks or the APs 30 thereof. For instance, each SDN infrastructure instance 110 can be associated with a respective metropolitan area and can be coupled to APs 30 serving mobile devices 20 within that metropolitan area. Each local SDN infrastructure instance 110 can include a respective plurality of computer devices 115, such as computer servers or racks of servers configured to carry out network operations or functions implemented as SDN elements to serve data traffic associated with APs 30 coupled to (or served by) that local SDN infrastructure instance 110. In some implementations, the computer devices 115 associated with a respective local SDN infrastructure instance 110 can be configured to carry out latency sensitive network functions. For instance, control-plane signaling, data plane anchoring, and local mobility within a given local SDN infrastructure instance 110 can be implemented as SDN elements executable by (or running on) the respective computer devices 115.

In some implementations, each local SDN infrastructure instance 110 can include load balancing entities configured to balance the load between the respective computer devices 115 or the SDN elements running thereon. In some implementations, each local SDN infrastructure instance 110 can be configured to locally cache Internet data associated with one or more content providers. For instance, each local SDN infrastructure instance 100 can include one or more caching servers. The local SDN infrastructure instance 110 can be configured to serve Internet data in response to request(s) from mobile devices 20 from local caches whenever the requested Internet data is locally cached. Internet data can include webpages, data associated with online services (such as email, social media, etc.), data associated with games, video streaming data (such as Netflix or YouTube), or the like.

The central SDN infrastructure instance 120 can include one or more computer devices with SDN elements running thereon configured to carry out network functions that are not (or are at least less) latency sensitive or network functions involving multiple local SDN infrastructure instances 110. The SDN elements running in the central SDN infrastructure instance 120 can include, for instance, a subscription policy module(s), modules for managing global mobility (or roaming) between local SDN infrastructure instances 110 or a combination thereof. The subscription policy module(s) can include an authorization, authentication and accounting (AAA) server, subscription profile repository (SPR), policy and charging control module or other modules for managing subscription policies. During attachment of a mobile device to the distributed SDN packet core system, a local SDN infrastructure instance 110 can request authentication or authorization of a mobile device (or a user thereof) from a subscription and policy module associated with the central SDN infrastructure instance 120. The central SDN infrastructure instance also can include a global load balancing module for balancing load between the plurality of local SDN infrastructure instances 110. The central SDN infrastructure instance 120 can be arranged in the cloud (such as in one or more host data centers).

Each local SDN infrastructure instance 110 can be coupled to APs 30 in its proximity through a respective metropolitan area network 12. The metropolitan area networks 12 can differ from one local SDN infrastructure instance 110 to another. In some implementations, a local SDN infrastructure instance can be coupled to respective APs 30 through one or more metropolitan area networks 12. For a given local SDN infrastructure instance 110, the respective metropolitan area network(s) 12 can be one or more communications network(s) serving a metropolitan area associated with that local SDN infrastructure instance 110. In some implementations, one or more of the metropolitan area networks 12 can be owned or managed by respective third-party network providers and may not be part of the distributed SDN packet core network. In some implementations, each AP 30 can be coupled to (and served by) the geographically closest local SDN infrastructure instance 100. In some implementations, coupling between the APs 30 and entities (such as computer devices 115 or SDN element (s) running thereon) within the local SDN infrastructure instance 110 can be achieved through respective transport tunnels 35 over the metropolitan area network(s) 12. For instance, transport tunnels 35, such as Ethernet-over-IP (EoIP) tunnels, can be used over metropolitan area networks 12 that provide IP connectivity to local SDN infrastructure instances 110. In some implementations, the transport tunnels 35 can include an Ethernet-over-IP tunnel, generic user datagram protocol (UDP) encapsulation (GUE) tunnel, generic route encapsulation (GRE) tunnel, 802.11 over GUE tunnel, GPRS tunneling protocol (GTP) tunnel, Internet Protocol (IP) security (IPSec) tunnel, other type of tunnel or a combination thereof.

In some implementations, the plurality of local SDN infrastructure instances 110 can be inter-connected through a first transit network 15. The first transit network 15 allows for communication between separate local SDN infrastructure instances 110, for instance, to handle roaming between local SDN infrastructure instances 110. In some implementations, the first transit network 15 can be configured to couple the local SDN infrastructure instances 110 to the central infrastructure instance 120. The first transit network 15 can include a fiber-optic data network, an Internet service provider (ISP) network or other communication networks. The first transit network 15 and the plurality of local SDN infrastructure instances 110 can be managed (or owned) by a single entity or separate entities. In some implementations, the first transit network 15 can be owned or managed separately from the local SDN infrastructure instances 110. That is, the first transit network 15 may not be part of the distributed SDN packet core system but rather an external network used to communicatively couple the local SDN infrastructure instances 110 to each other.

The communication environment 10 can include a plurality of data centers 90. Each data center 90 can include computing devices for storing and providing access to content provider data, web pages or a combination thereof. For instance, the data centers 90 can be configured to receive data requests from the local SDN infrastructure instances and, in response, provide the requested data. The data centers 90 can be configured to host web pages and respective content, video streaming applications such as YouTube or Netflix, social media applications and content, gaming applications, enterprise applications or any other cloud applications or services. In some implementations, the central SDN infrastructure instance(s) 120 can be implemented within a data center 91.

Each local SDN infrastructure instance 110 can be communicatively coupled to the data centers 90 through one or more second transit networks 18. The second transit network (s) 18 can be coupled to the local SDN infrastructure instances 110 through the first transit network 15. In some implementations, the second transit network(s) 18 can be directly coupled to the local SDN infrastructure instances 110. In some implementations, the second transit network(s) 18 can be configured to couple the central SDN infrastructure instance 120 to the local infrastructure instances 110. In some implementations, the second transit network(s) 18 can be optional. In such implementations, the data centers 90 can be directly coupled to the first transit network 15. In some implementations, the first and second transit networks 15 and 18 can be part of a single communications network.

In some implementations, the distributed SDN packet core system can be viewed as the combination of the local SDN infrastructure instances 110 and the central SDN infrastructure instance 120. In some implementations, the distributed SDN packet core system can also include the first transit network 15. In some implementations, the distributed SDN packet core system can also include the second transit network(s) 18. The architecture of the distributed SDN packet core system (as described with respect to FIG. 1) allows for data traffic to be routed and broken-out locally, for instance, at the local SDN infrastructure instances 110. Arranging local SDN infrastructure instances 110 at close proximity to APs 30 and processing data traffic therein allows for fast data packet processing and therefore improved performance and reduced network resources consumption.

Figure 2A:
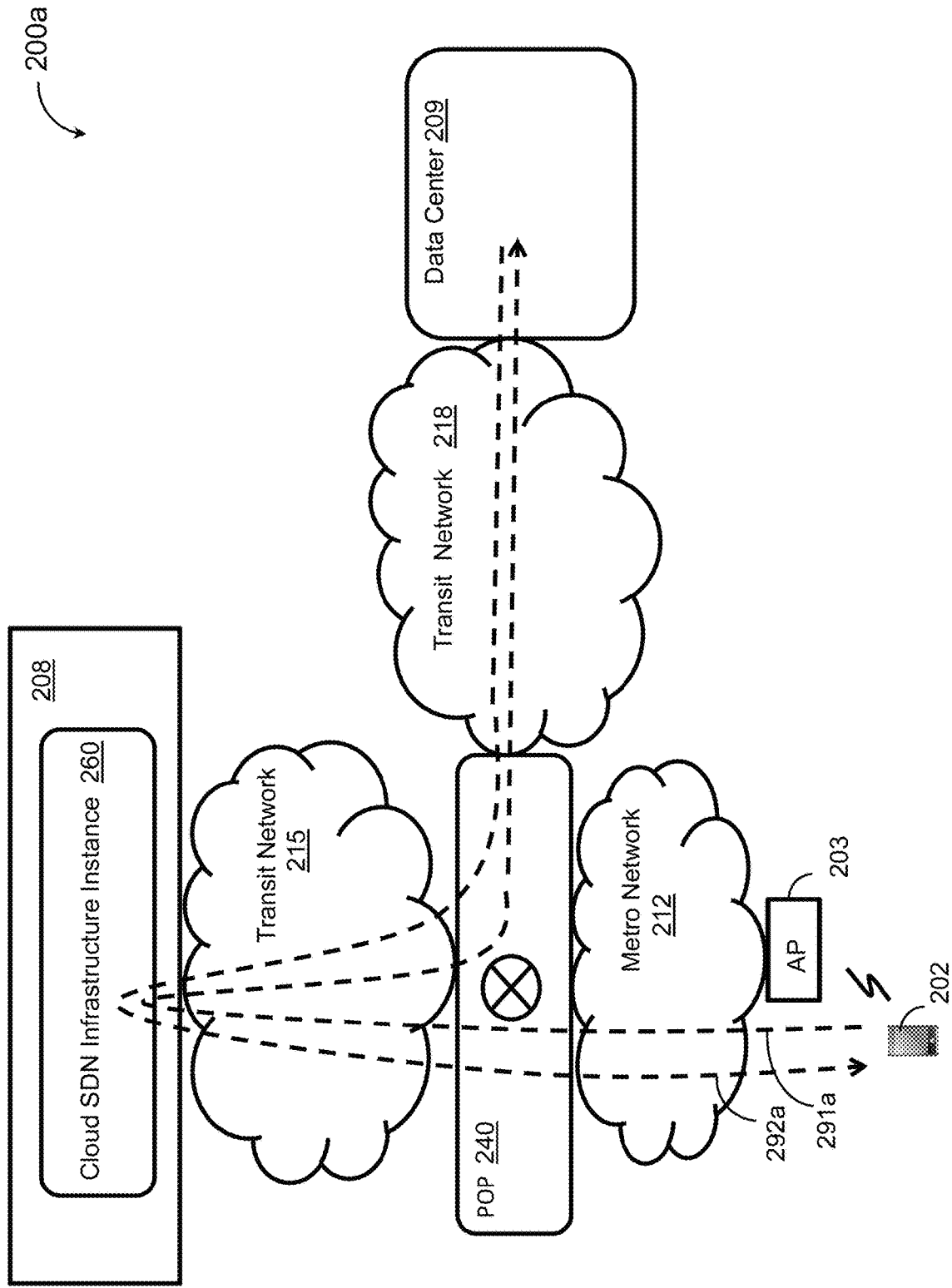
FIGS. 2A and 2B show block diagrams illustrating data paths associated with two SDN packet core architectures.
Figure 2B:
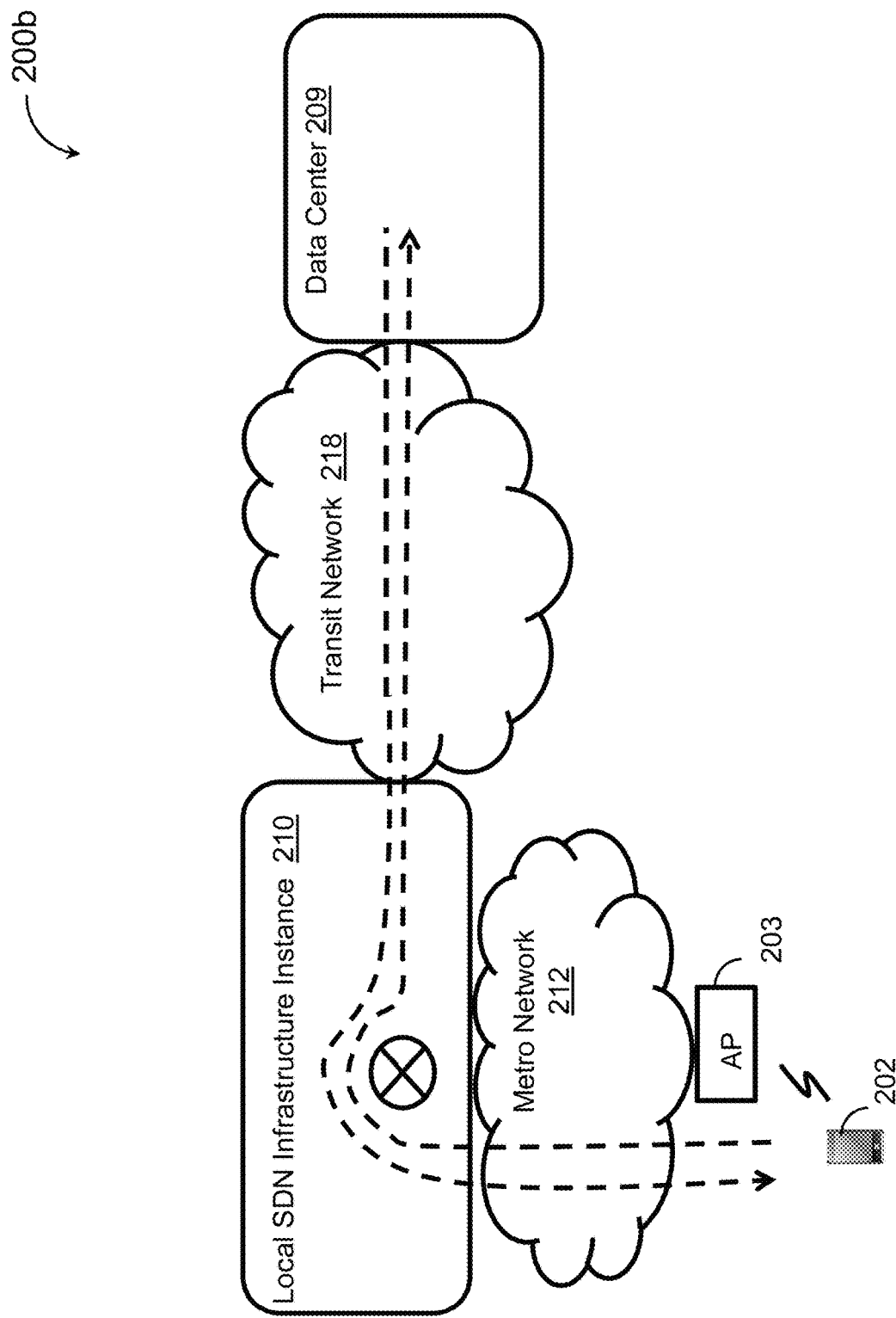

FIGS. 2A and 2B show diagrams illustrating data paths associated with two SDN packet core architectures. The diagram of FIG. 2A illustrates a cloud-based SDN packet core architecture 200a whereas the diagram of FIG. 2B illustrates a distributed packet core architecture 200b.

Referring to FIG. 2A, a cloud-based SDN packet core system can include a cloud SDN infrastructure instance 260 and a local communication junction point 240 arranged between the first transit network 215 and the second transit network 218. The communication junction point 240 can be communicatively coupled to the cloud SDN infrastructure instance 260 through the first transit network 215. The communication junction point 240 can be coupled to one or more radio access points (APs) 203 in its proximity through a metropolitan area network 212. The AP(s) 203 can be configured to serve mobile devices 202 in its neighborhood. The communication junction point 240 can be communicatively coupled to a data center 209 through the second transit network 218.

Packet core functions or operations are performed within the cloud (such as within a data center 208) by the cloud SDN infrastructure instance 260. For instance, when a mobile device 202 attempts to access Internet content, the mobile device 202 generates and sends a respective data request to the cloud SDN infrastructure instance 260. As indicated through the data request path 291a, the data request can be forwarded by the AP 203 to the communication junction point 240 through the metropolitan area network 212. The communication junction point 240 can then forward the data request to the cloud SDN infrastructure instance 260 through the first transit network 215. The cloud SDN infrastructure instance 260 can process the data request and send it to the data center 209 through the first transit network 215, the communication junction point 240 and the second transit network 218. Upon receiving the data request, a processor associated with the data center 209 can respond by sending the requested data to the cloud SDN infrastructure instance 260 through the second transit network 218, the communication junction point 240 and the first transit network 215 as shown by the requested data path 292a. The cloud SDN infrastructure instance 260 can then send the requested data to the mobile device 202 through the first transit network 215, the communication junction point 240, the metropolitan area network 212 and the AP 203. In some instances, the AP 203 may be configured to establish direct tunnels to the cloud SDN infrastructure instance 260. In such instances, the data paths 291a and 292a still need to go through the host data center 208.

FIG. 2B shows a diagram illustrating a data path associated with a distributed SDN packet core architecture 200b of a distributed SDN packet core system similar to that described above with respect to FIG. 1. Compared to the cloud-based SDN packet core architecture 200a, the distributed SDN packet core architecture 200b employs a local SDN infrastructure instance 210 arranged in proximity to one or more AP(s) 203 to locally process data traffic associated with the AP(s) 203 (instead of processing data traffic in the cloud). That is, most control plane and data plane operations are performed locally by the local SDN infrastructure instance 210. As such, a data request generated by a mobile device 202 goes through the AP 203 and the metropolitan area network 212 to reach the local SDN infrastructure instance 210 as shown by the data request path 291b. The local SDN infrastructure instance 210 can forward the data request to the data center 209 through the transit network 218. In response to the data request, a processor associated with the data center 209 can send the requested data to the local SDN infrastructure instance 210 through the transit network 218 and the local SDN infrastructure instance 210 can forward the requested data to mobile device 202 through the metropolitan area network 212 and the AP 203 as shown through the requested data path 292b.

By comparing the data request paths 291a and 291b and the requested data paths 292a and 292b one can conclude that employing a cloud-based SDN packet core architecture (such as the architecture 200a) leads to traffic hairpinning between data sources (such as data centers 90) and data sinks (such as mobile devices 202) over long data paths (such as the requested data path 292a). In particular, data centers (such as data centers 208 and 209) tend to be arranged in remote geographic locations, with respect to population centers, where power and space are acquired cost effectively. As such, implementing a virtual packet core (such as the cloud SDN infrastructure instance 260) within a hosting data center 208 leads to data paths including long communication links between communication junction point(s) 240 arranged in metropolitan areas and the hosting data center. Such hairpinning represents a significant cost on long-haul backbone capacity and results in added latency, which adversely affects user experience. In contrast, the distributed SDN packet core architecture 200b (also discussed with regard to FIG. 1) allows for local processing of data traffic and significant reduction in communication with hosting data centers (such as a hosting data center including the centralized SDN infrastructure instance 120 shown in FIG. 1). As a result, the distributed SDN packet core architecture 200b can avoid unnecessary latency and can reduce backbone capacity usage compared to the cloud-based SDN packet core architecture 200a.

Implementing network functions as SDN elements allows for scaling of the distributed SDN packet core system, for instance, by adding more computer devices 115 within one or more local SDN infrastructure instances 110 to accommodate increasing service demand. Software-based implementation of a packet core network can also be achieved through Network Function Virtualization (NFV), where monolithic functions specific to a given RAT (such as the mobility management entity (MME), the serving gateway (SGW) or the packet data network (PDN) gateway (PGW) for LTE) are implemented into respective virtualized monolithic entities within a generic computer infrastructure. The NFV implementation also includes virtualization of RAT-specific protocols and communication tunnels, for instance, to allow communication between the virtualized monolithic entities. The virtualized protocols and communication tunnels present a limiting factor with respect to scalability. For instance, extending the virtualized protocols or communication tunnels to create new services (such as adding WiFi to a network supporting 3GPP RATs) can involve significant modification to every virtualized monolithic entity that implements any of the virtualized protocols or communication tunnels. Also, implementation of new data plane constructs can be limited by existing virtualized monolithic entities.

In the distributed SDN packet core system described in the current disclosure, the control plane and the data plane can be separated in each local SDN infrastructure instance 110. Each local SDN infrastructure instance 110 can include separate control-plane and data-plane software modules. Packet processing functions or operations common to distinct RATs (such as network address translation (NAT), firewall, address delegation, etc.) can be abstracted and implemented into protocol independent back-end data-plane modules running on one or more computer devices 110. Also, control-plane modules can be configured to provide protocol abstraction and handle RAT-specific control plane signaling and data-plane inter-operation with external systems. The abstraction and separation of control and data planes allow for flexibility and scalability of the distributed SDN packet core system. For instance, a new RAT can be rapidly and seamlessly integrated into an existing distributed SDN packet core system by adding respective control-plane modules and/or respective data-plane modules into the local SDN infrastructure instances 110 and incorporating respective subscription and policy modules into the central SDN infrastructure instance 120. Also, expanding the capacity of a given local SDN infrastructure instance 110 can be achieved, for instance, by adding more computer devices implementing control-plane modules or data-plane modules associated with one or more RATs. In some implementations, scaling the distributed SDN packet core system (either to integrate new RATs or to increase system capacity) described in the current disclosure does not involve modification to software running on mobile devices 20.

Figure 3:
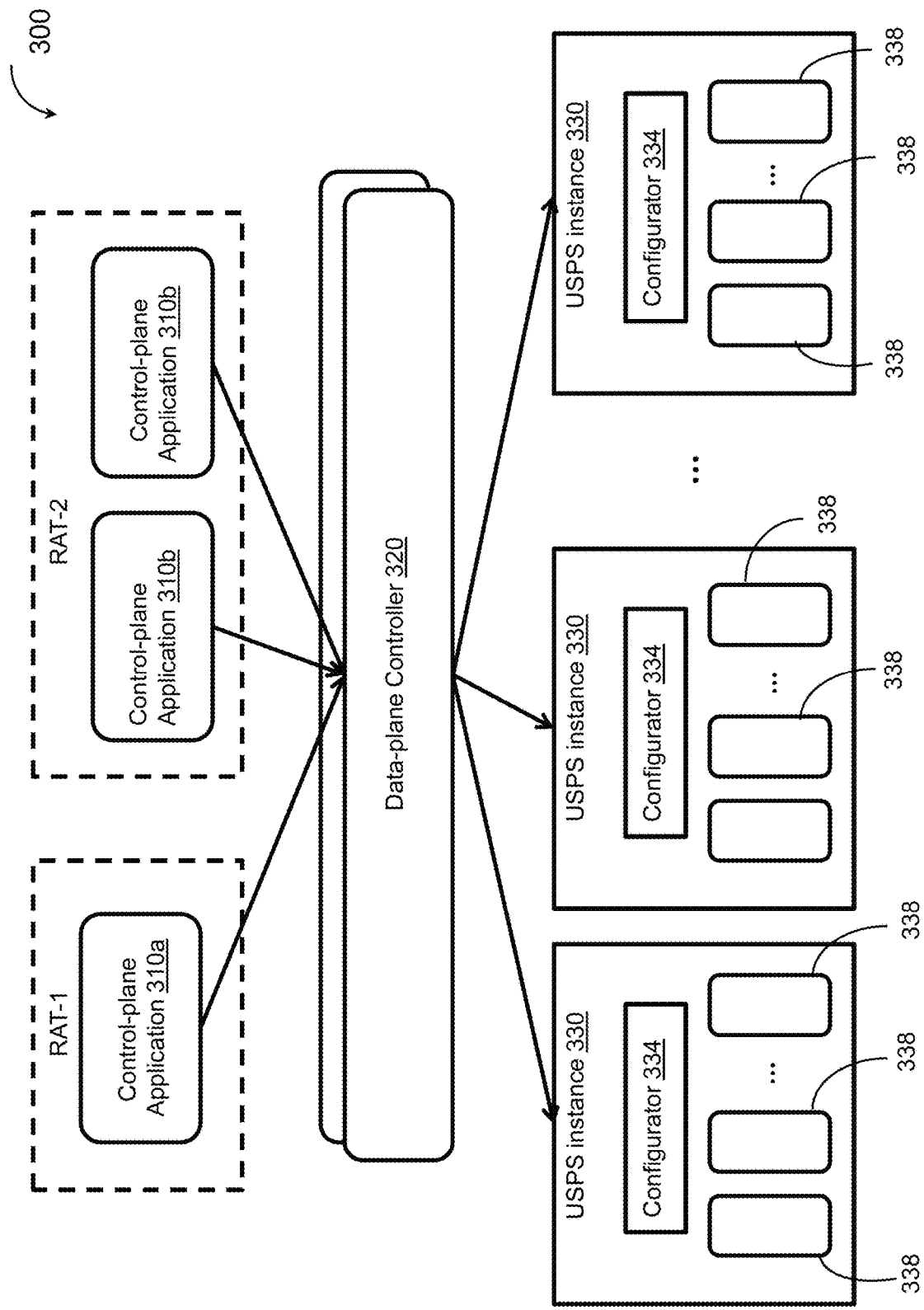
FIG. 3 shows a block diagram illustrating a software architecture of a local SDN infrastructure instance.

FIG. 3 shows a block diagram illustrating a software architecture of a local SDN infrastructure instance 300. The local SDN infrastructure instance 110 can include a plurality of RAT-specific control-plane modules (or applications) 310a and 310b (also referred to individually or collectively as control-plane module(s) 310), one or more data-plane controllers 320, and a plurality of data-plane instances 330 (also referred to as user-space packet switching (USPS) instances 330. Each USPS instance can include a configuration module 334 (also referred to as a configurator 334) and one or more RAT-independent data-plane back-end modules 338.

Referring to FIGS. 1 and 3, each local SDN infrastructure instance 110 can include a plurality of RAT-specific control-plane modules (or control-plane applications) such as control-plane modules 310a and 310b (also referred to individually or collectively as control-plane module(s) 310) associated with at least two RATs. For each RAT, a respective set of RAT-specific control-plane modules 310 can be configured to handle signaling and control-plane operations associated with that RAT. For instance, the control-plane module 310a can be associated with a first RAT while the control-plane modules 310b can be associated with a second RAT different from the first RAT. A local SDN infrastructure instance 110 can include multiple instances of any given control-plane module 310.

The control-plane modules 310 for a given RAT can be configured to handle signaling and control-plane interactions with APs 30, the central SDN infrastructure instance 120, other local SDN infrastructure instances or external systems such as the data centers 90 or other external networks. For each RAT, the respective set of control-plane modules 310 can include one or more front-end modules communicatively coupled to APs 30 associated with that RAT. For instance, a local SDN infrastructure can include one or more LTE front-end (LFE) modules configured to communicate with eNodes B and one or more WiFi front-end (WFE) modules configured to communicate WiFi access points. The front-end modules can be configured to establish communication tunnels such as Ethernet-over-IP (EoIP) tunnels with respective APs 30. In some implementations, the control-plane modules 310 can include gateway modules for encrypting the communication tunnels between the APs 30 and respective front-end modules.

For each RAT, one or more respective control-plane modules 310 can be configured to implement standards-based state machines (such as the mobility management entity for LTE) for a corresponding wireless access network using a set of flow rules. For instance, front-end modules can be configured to create forwarding paths based on interactions with APs 30 and flow rules. As such, front-end modules can be configured to function as SDN routers. Flow rules can include instructions for execution by the data-plane back-end modules 338 to drop, forward, encapsulate, de-capsulate data packets or perform other data packet processes. In some implementations, the control-plane modules 310 can be configured to provide flow rules to the data-plane controller 320 for execution by the back-end data-plane modules 330.

The control-plane modules 310 can be configured to communicate with each other. In some implementations, signaling messages between interacting control-plane modules 310 (such as LTE MME and PGW) can be implemented using protocol buffers that are independent of RAT protocols. Compared to NFV-based virtualization which employs RAT-specific protocols (or communication tunnels) to implement communications between virtualized monolithic entities (corresponding to monolithic entities specific to a given RAT), using protocol buffers that are independent of RAT protocols allows for flexible and scalable SDN implementation of the packet core system.

Each local SDN infrastructure instance 310 can include one or more data-plane controllers 320. The data-plane controller(s) 320 can be configured to mediate interactions between the control-plane modules 310 and the USPS instances 330. The data-plane controller(s) 320 can be configured to receive packet processing requests from the control-plane modules 310 and forward the requests to the USPS instances 330. The data-plane controller 320 an be configured to communicate with the control-plane modules 310 through a RAT independent interface. In some implementations, the RAT independent interface can be implemented using a RAT independent configuration language based on rules. A rule can include a matching filter and one or more instructions. The matching filter can be indicative of one or more packet header fields that when matched, the one or more instructions are applied to the respective data packet. In some implementations, each rule can be associated with a respective identifier. For instance, each rule can be stored within a data structure, such as a table, (including a respective matching filter and one or more respective instructions and) having a respective identifier. In such implementations, the control-plane modules 310 and the data-plane controller 320 can signal rules to one another by sending respective identifiers.

The data-plane controller(s) 320 can be configured to receive rule updates from the control-plane modules 310. Upon receiving a rule update, the data-plane controller 320 can determine which USPS instance(s) 330 the rule update applies to and forward the update to the determined USPS instance(s) 330. In some implementations, the data-plane controller 320 can maintain a data structure (such as a table) mapping USPS instances rules associated therewith. In such implementations, the data-plane controller 320 can determine USPS instances to which a received rule update applies based on the maintained data structure. The data-plane controller 320 can also be configured to receive counter reports from USPS instances 330, determine control-plane modules 310 to receive the counter reports, and forward the counter reports to the determined control-plane modules 310. Reported counters can be associated with the amount of input data, amount of output data, classifier matches, discarded packets, flow action enforcement events such as encapsulation or de-capsulation events, or a combination thereof. The data-plane controller can be configured to receive events from the USPS instances 330 and forward the received events to the control-plane modules 310. The data-plane controller 320 also can be configured to maintain heartbeat with the control-plane modules and with the USPS instances 320. That is, the data plane controller 320 can be configured to perform liveness checks to monitor the health of the control-plane modules 310 and use the respective health statuses to handle failure conditions. For instance, the data plane controller 320 can be configured to drain flow rules associated with an inactive control-plane module 310.

Each local SDN infrastructure instance can include a plurality of data-plane instances 330. In some implementations, each data-plane instance 330 can be running on a respective computer device 115. In some implementations, each data-plane instance 330 can include a configuration module 334 and multiple back-end data-plane modules (also referred to as packet processing engines) 338. The configuration module 334 can be configured to interact with the data-pane controller 320. In particular, the configuration module 334 can be configured to translate packet processing requests received from the data-pane controller 320 into a configuration specific to the data-plane modules 338. For instance, the configuration module 334 can translate rules (or indications thereof) received from the data-plane controller into packet modification processes (or indications thereof) to be performed by the back-end data-plane modules 338. In some implementations, the packet modification processes can be indicated through modification tables specific to the back-end data-plane modules 338. In such implementations, the configuration module 334 can be configured to map rule table identifiers received from the data-plane controller 320 to modification tables (or indications thereof) specific to the back-end data-plane modules 338. Each modification table can be indicative of one or more processes to be performed on data packets.

Each USPS instance 330 can include a plurality of back-end data-plane modules 338. In some implementations, each back-end data-plane module 338 can include a collection of packet processing elements. The collection of packet processing elements can be arranged in a sequence (or "pipeline") and configured to sequentially process data packets. In some implementations, packet processing elements within a respective back-end data-plane module can be configured to interact with each other through push or pull interfaces. That is, a packet processing element can be configured to pull data packets from one or more other packet processing elements and/or push data packet to one or more other packet processing elements.

Figure 4:
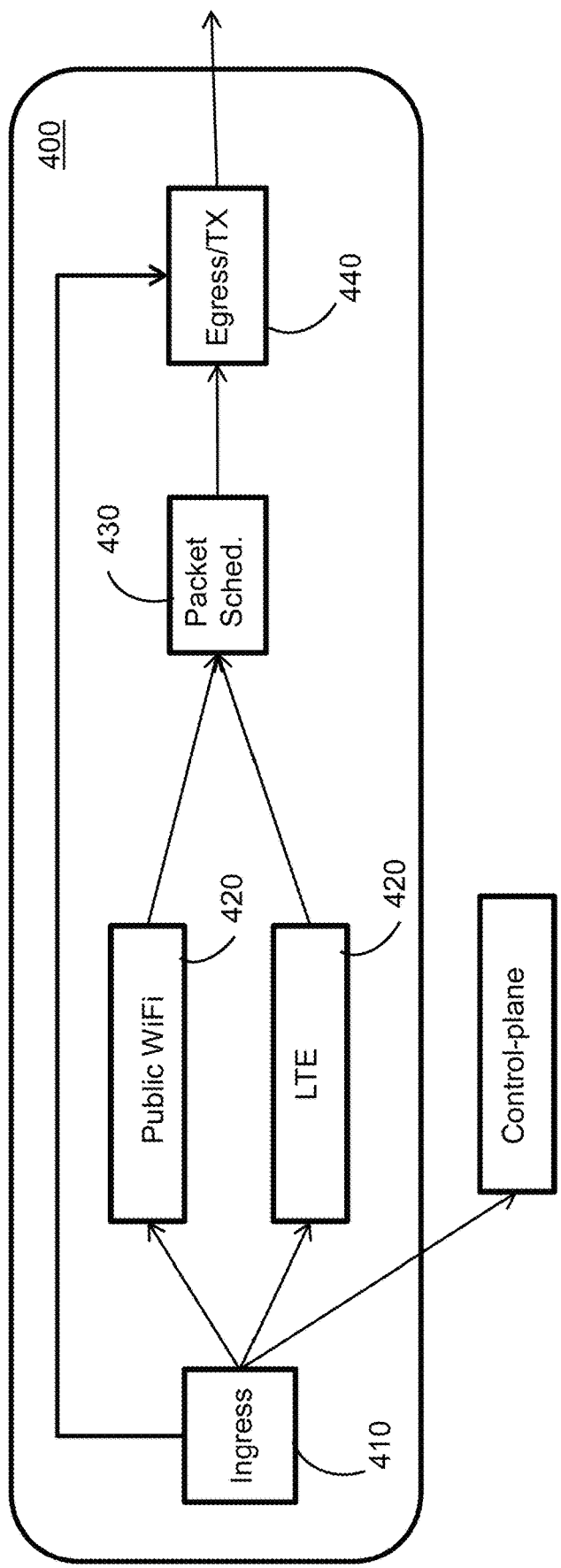
FIG. 4 is a block diagram illustrating an implementation of a data-plane module.

FIG. 4 shows a block diagram illustrating an implementation of a back-end data-plane module 400. The data-plane module 400 can include an ingress element 410, one or more protocol-specific processing elements 420, a packet scheduling element 430 and an egress element 450. The ingress element 410, the protocol-specific processing element(s) 420, the packet scheduling element 430 and the egress element 440 can be implemented as software elements configured to process data packets based on data structures maintained (or accessible) by the back-end data-plane module 400.

The ingress element 410 can be configured to receive data packets, for instance, from a local load balancer or the control-plane modules 310. The ingress element 410 can be configured to determine a next destination of a received data packet based on the destination IP address of the data packet and/or other information associated with the data packet. For instance, the ingress element 410 can employ data packet information associated with the third layer (L3), fourth layer (L4), seventh layer (L7) or a combination thereof to determine the next destination of the received data packet. The ingress element 410 can have access to a respective ingress data structure such as an ingress demux table. The ingress element 410 can be configured to employ the ingress data structure to determine next destinations of received data packets. The ingress data structure can be configured to map data packet field values (such as IP destination address or other header field values) to destination entities. Based on the ingress data structure, the ingress element 410 can determine that a received data packet is to be processed by another computer device 115, in which case the ingress element can forward the data packet to the egress element 440 for sending to the other computer device 115. If the ingress element 410 determines that the data packet is to be processed within the back-end data-plane module 400, the ingress element 410 can forward the data packet to a protocol-specific element for processing the data packet. In some instances, the ingress element 410 can forward a received data packet to control-plane modules 310 based on the ingress data structure.

The back-end data-plane module 400 can include multiple protocol-specific processing elements 420 associated with distinct protocols. The protocol-specific processing elements 420 can be associated with distinct RATs such as LTE and public WiFi. The protocol-specific elements 420 can include a GPRS tunneling protocol (GTP) processing element, traffic flow template (TFT) processing element or other protocol-specific processing elements. The GTP processing element can be configured to receive a GTP-encapsulated data packet and use a respective tunnel endpoint identifier (TEID) to determine respective subscriber information. The GTP processing element can employ a GTP TEID data structure (such as GTP TEID lookup table) to determine the subscriber information. The GTP TEID data structure can be configured to map each TEID to a respective subscriber session/bearer. The GTP processing element can be configured to update one or more data packet counters, de-capsulate the GTP header and put the data packet in a queue for further processing or for sending to the egress element 440.

The TFT processing element can have access to a TFT lookup table. The TFT lookup table can be configured to map TFT specifications to respective subscriber sessions/bearers. A TFT specification defines one or more rules associated with a respective data flow. The TFT processing element can be configured to receive an IP data packet and identify a respective subscriber session/bearer based on the TFT table. Upon identifying the subscriber session/bearer, the TFT processing element can update one or more data packet counters, encapsulate the GTP header, and put the data packet in an appropriate queue based on a respective quality of service (QoS).

The protocol-specific processing elements can include other processing elements such as a generic routing encapsulation (GRE) processing element, a generic user datagram protocol (UDP) encapsulation (GUE) processing element or other processing elements depending on protocols employed by RATs supported by the distributed SDN packet core system.

The packet scheduling element 430 can be configured to take data packets from a number of queues associated the protocol-specific processing elements 420 and pass the data packets to the egress element 440 for sending, for instance, to a network interface card (NIC). In some implementations, the packet scheduling element 430 can be configured to operate according to a round-robin scheduler. In some implementations, the packet scheduling element 430 can be configured to schedule data packets based on respective QoS. That is, the packet scheduling element 430 can be configured to prioritize data packets (or respective queues) with relatively high QoS with respect to other data packets.

The egress element 440 can be configured to receive data packets from the ingress element or from the packet scheduling element output 430 and output them, for instance, to a network interface card (NIC). The egress element 440 can have access to a forwarding information base (FIB) lookup table and a neighbor table such as an address resolution protocol (ARP) lookup table. In the FIB lookup table, each entry points to a next hop entry in the neighbor lookup table. The ARP lookup table can be used to convert a network address (such as an IPv4 address) to a physical address such as an Ethernet address (or MAC address). As such, the egress element 440 can be configured to add an Ethernet header to a received data packet based on the FIB and ARP lookup tables. The egress element 440 can then send the data packet to a network interface card (NIC). In some implementations, control-plane modules 110 can cause entries of the FIB lookup table to be programmed to cause a given type of processing (such as GTP processing) to be applied to data packets with specified header field values.

The software elements shown in Figure describe an illustrative but non-limiting implementation of the back-end data-plane modules 400 or 338. For instance, two or more elements (such as the packet scheduling element 430 and the egress element 440) can be combined into a single software element. Also, one or more of the software elements described in FIG. 4 can be split into multiple software elements. The back-end data-plane modules 400 04 338 can include other software elements (other than those described with respect to FIG. 4) depending on the RATs or protocols supported by the distributed SDN packet core system or depending on the implementation of the back-end data-plane modules 400 or 338.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

The invention claimed is:

1. A distributed software defined network (SDN) packet core system comprising:
a policy module configured to manage policies for client devices associated with the distributed SDN packet core system; and
a plurality of computer devices arranged geographically in proximity, and communicatively coupled, to a respective plurality of radio access points associated with at least two radio access technologies (RATs) and separate from the plurality of computer devices, the computer devices being configured to execute software modules for processing control messages and data packets of communication flows associated with the respective radio access points as part of supporting a plurality of local SDN infrastructure instances, the software modules including:
a plurality of RAT-specific control-plane modules associated with the at least two radio access technologies (RATS), each RAT-specific control-plane module configured to execute signaling and control operations for communication flows associated with a respective RAT; and
at least one data-plane controller configured to receive packet processing requests from at least one RAT-specific control-plane module and forward the requests to one or more data-plane instances established as part of at least one of the plurality of local infrastructure SDN instances, wherein each of the one or more data plane instances includes a configuration module and at least one data-plane module, the configuration module configured to translate packet processing requests received from the at least one data-plane controller into a configuration specific to the at least one data-plane module;
wherein the at least one data-plane controller is configured to interact with the RAT-specific control-plane modules using a RAT-independent interface employing communication flow rules, receive one or more counter reports from one or more of the data-plane instances, determine at least one control-plane module to receive the one or more data counter reports, and forward the one or more data counter reports to the at least one control-plane module determined.

2. The distributed SDN packet core system of claim 1, wherein the at least one data-plane controller is further configured to: receive an update associated with a communication flow rule; and forward the update to the one or more data-plane instances configured to execute the communication flow rule.

3. The distributed SDN packet core system of claim 1, wherein each communication flow rule includes: an indication of at least one data packet header field value; and one or more instructions for applying to data packets including the at least one data packet header field value.

4. The distributed SDN packet core system of claim 1, wherein the at least one data plane controller is configured to: periodically check health statuses of the control-plane modules; and manage failure conditions determined based on the health statuses of the control-plane modules.

5. The distributed SDN packet core system of claim 1, wherein the RAT-specific control-plane modules include RAT-specific front-end modules, each RAT-specific front-end module being communicatively coupled to, and configured to process signaling with, one or more radio access points associated with a respective RAT.

6. The distributed SDN packet core system of claim 1, wherein each front-end module is communicatively coupled to the one or more radio access points through respective transport tunnels.

7. The distributed SDN packet core system of claim 1, wherein the respective transport tunnels include at least one of an Ethernet-over-IP tunnel, generic user datagram protocol (UDP) encapsulation (GUE) tunnel, generic route encapsulation (GRE) tunnel, 802.11 over GUE tunnel, GPRS tunneling protocol (GTP) tunnel and Internet Protocol (IP) security (IPSec) tunnel.

8. The distributed SDN packet core system of claim 1, wherein RAT-specific control-plane modules are communicatively coupled to the radio access points through a metropolitan area network.

9. The distributed SDN packet core system of claim 1, wherein the plurality of local SDN infrastructure instances communicatively coupled to each other through at least one transit network.

10. The distributed SDN packet core system of claim 1, wherein the plurality of local SDN infrastructure instances communicatively coupled to one or more data centers through one or more transit networks.

11. The distributed SDN packet core system of claim 9, wherein the at least one local SDN infrastructure instance of the plurality of local SDN infrastructure instances includes a data cache for caching data associated with a content provider.

12. The distributed SDN packet core system of claim 1, wherein the RAT-specific network functions include at least a Serving Gateway (SGW) function and Packet Data Network Gateway (PGW) function specific to at least two of the respective RATs.

13. The distributed SDN packet core system of claim 1, wherein the configuration module is configured to translate communication flow rules received from the at least one data plane controller into at least one packet modification process.

14. The distributed SDN packet core system of claim 13, wherein the at least one packet modification process is performed by the at least one data plane module.

15. The distributed SDN packet core system of claim 1, wherein the configuration module is further configured to map rule table identifiers received from the at least one data plane controller to at least one modification table specific to the at least one data plane module.

16. The distributed SDN packet core system of claim 15, wherein each of the at least one modification table is indicative of one or more processes to be performed on data packets.

17. The distributed SDN packet core system of claim 1, wherein at least two of the plurality of computer devices are associated with a local SDN infrastructure instance, the local SDN infrastructure instance including a given RAT-specific control-plane module of the plurality of RAT-specific control-plane modules, the given RAT-specific control plane module being implemented separately from a data-plane module associated with the local SDN infrastructure instance.

18. The distributed SDN packet core system of claim 1, wherein a control plane and a data plane associated with a given local SDN infrastructure instance are separated in the given local SDN infrastructure instance.

* * * * *